United States Patent [19]
Wysocki et al.

[11] 3,965,932
[45] June 29, 1976

[54] VACUUM VALVE

[75] Inventors: Lawrence E. Wysocki; Elmer W. Muench, both of Covina, Calif.

[73] Assignee: Everett/Charles, Inc., Pomona, Calif.

[22] Filed: Apr. 4, 1975

[21] Appl. No.: 565,243

[52] U.S. Cl................................. 137/607; 15/416
[51] Int. Cl.² ........................................ F16K 11/18
[58] Field of Search................... 15/416, 419, 421; 294/64, 65, 64 A, 64 B; 251/251; 137/596, 606, 607, 625.21

[56] References Cited
UNITED STATES PATENTS

| 2,519,448 | 8/1950 | Fairchild | 137/607 X |
| 2,704,685 | 3/1955 | Tyler et al. | 294/65 |
| 2,999,715 | 9/1961 | Firestone | 294/64 R |

*Primary Examiner*—Henry T. Klinksiek
*Attorney, Agent, or Firm*—Clarence A. O'Brien; Harvey B. Jacobson

[57] ABSTRACT

Suction pressure is applied to a desirable location by a valve assembly having a flat gate element elastically deformed by a selectively controlled cam actuator to unblock a flow passage between inlet and manifold portions of the valve body. A sealing gasket is peripherally mounted on the manifold portion in enclosing relation to an area larger than the flow area of the inlet portion. A vent passage to the manifold portion is unblocked when the gate element is closed, to repressurize the manifold chamber.

9 Claims, 9 Drawing Figures

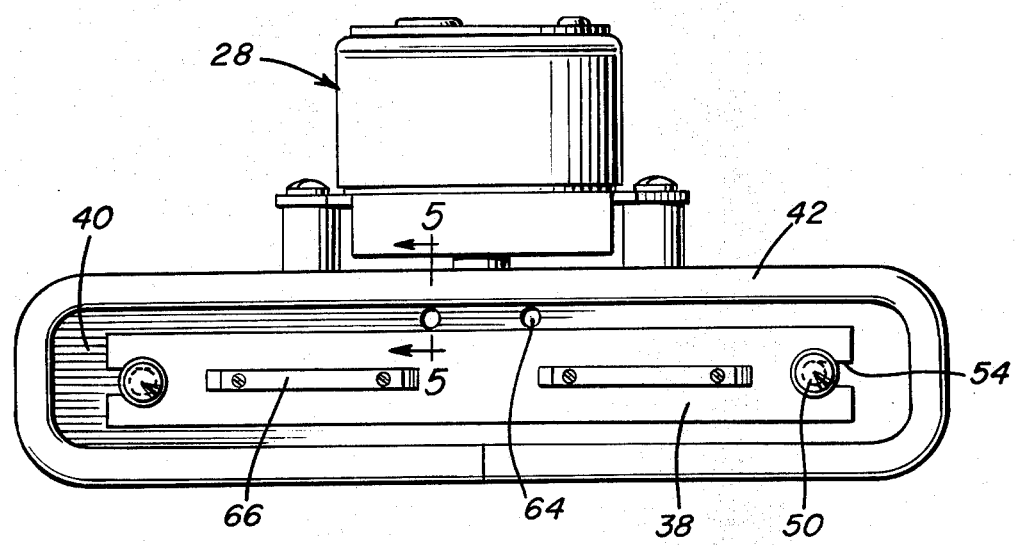
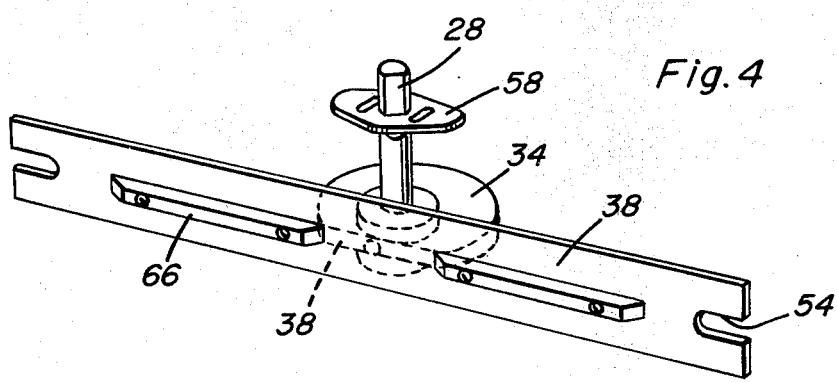
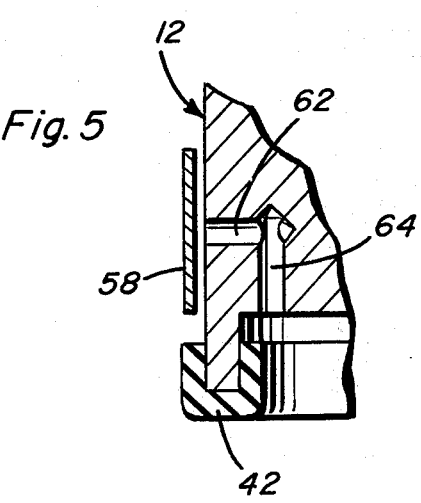
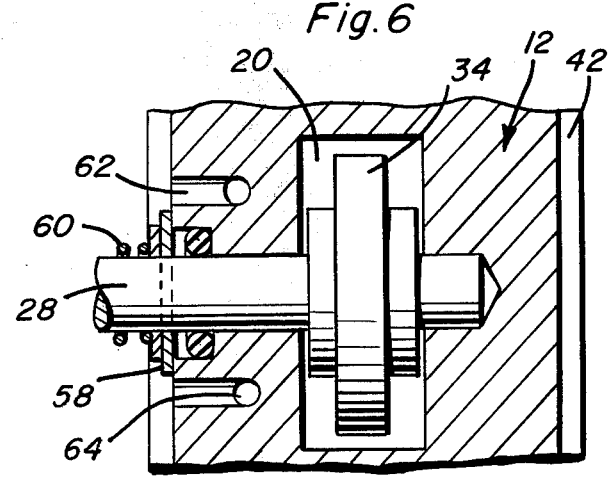

VACUUM VALVE

This invention relates to vacuum valve devices of the selectively actuated type.

The application of vacuum or suction pressure at a desired location, for example in connection with actuating test equipment and other instrumentation, is well known to those skilled in the art and often requires relatively large and expensive equipment including a high capacity vacuum pump and a receiver tank. It is therefore an important object of the present invention to provide a vacuum valve assembly that is relatively inexpensive in construction and operation and yet effective to apply suction pressure without large and expensive associated equipment.

In accordance with the present invention, the vacuum valve assembly includes a valve body having an inlet portion to which a suction conduit section is connected of predetermined flow area and a manifold portion extending over an area substantially larger than the predetermined flow area. A flow passage between the inlet and manifold chamber portions of the valve body is normally blocked by a flat leaf gate element which is elastically deformed by a cam actuator in order to unblock the passage and apply suction pressure to a desired location on test equipment as aforementioned for testing loaded printed circuit boards for example. The manifold portion of the valve body is peripherally lined with a sealing gasket adapted to seal the manifold chamber when placed against a surface of the circuit board test equipment prior to application of suction pressure in order to perform a test operation by displacing the circuit board to a contact position. The manifold chamber is vented to atmosphere simultaneously with the closing of the gate element for rapid recovery or re-pressurization of the manifold chamber causing return movement of the circuit board. As a result of the foregoing arrangement, the vacuum valve assembly of the present invention may be utilized with a relatively smaller vacuum pump while use of a receiver tank may be avoided.

Although various components of the vacuum valve assembly of the present invention are known such as disclosed in U.S. Pat. Nos. 1,758,419, 2,412,397, 2,446,334, 2,658,515, and 3,477,693, the particular structural combination of the present invention has not been heretofore assembled for the particular purposes of the present invention.

Objects and advantages which will become subsequently apparent reside in the details of construction and operation as more fully hereinafter described and claimed, reference being had to the accompanying drawings forming a part hereof, wherein like numerals refer to like parts throughout.

FIG. 3 is a bottom plan view of the valve assembly shown in FIG. 1.

FIG. 4 is a perspective view of the disassembled leaf gate element and cam actuator associated with the valve assembly.

FIG. 5 is an enlarged partial sectional view taken substantially through a plane indicated by section line 5—5 in FIG. 3.

FIG. 6 is an enlarged partial sectional view taken substantially through a plane indicated by section line 6—6 in FIG. 2.

Figure 1:
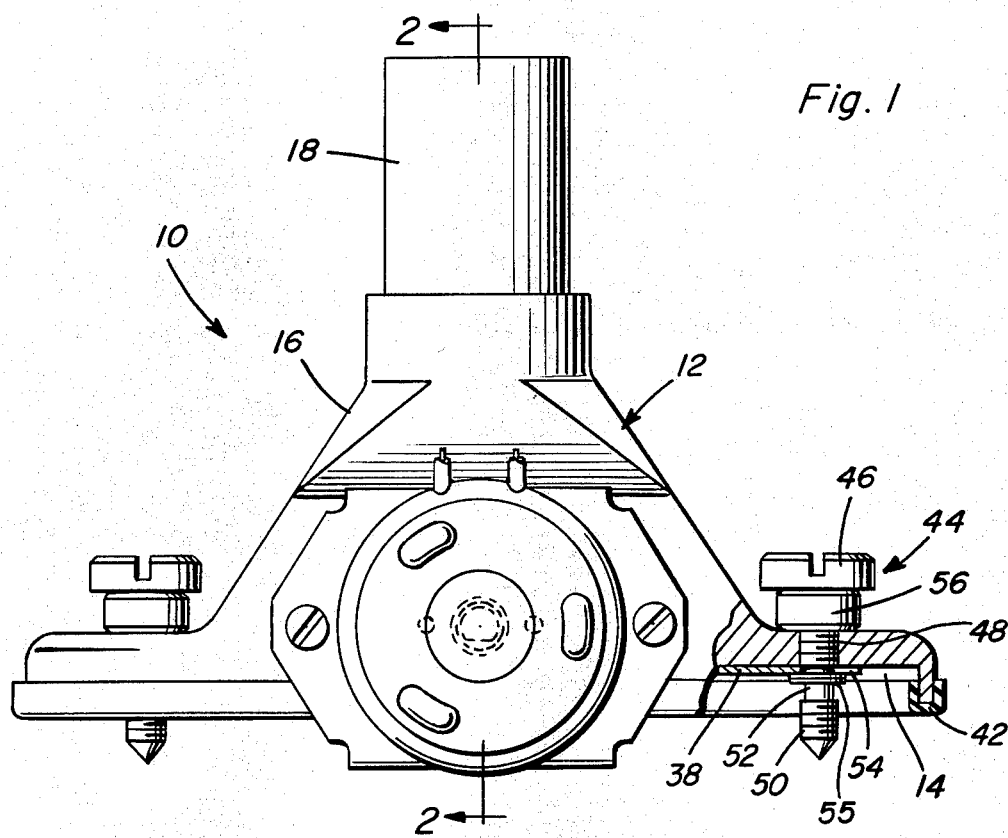
FIG. 1 is a side elevation view of one form of suction valve assembly constructed in accordance with the present invention, with parts broken away and shown in section.
Figure 2:
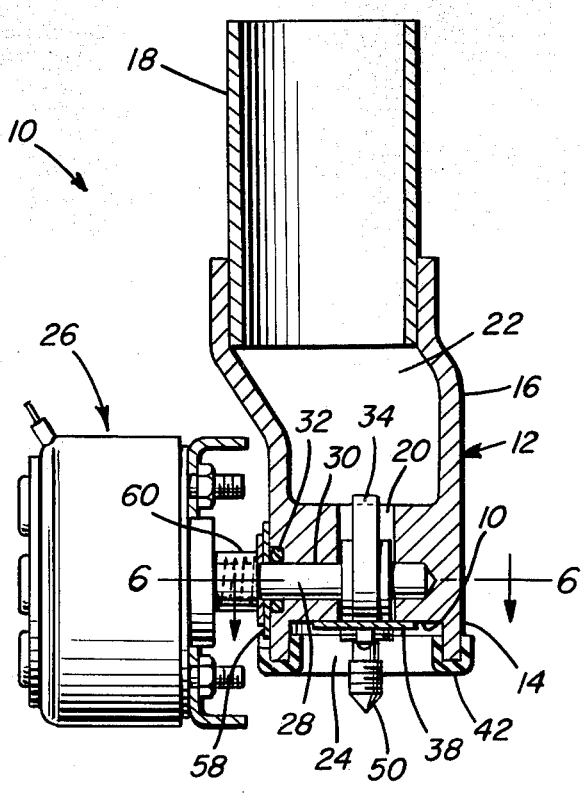
FIG. 2 is a side sectional view taken substantially through a plane indicated by section line 2—2 in FIG. 1.

Referring now to the drawings in detail, FIGS. 1 and 2 illustrate one form of a vacuum valve assembly constructed in accordance with the present invention and generally referred to by reference numeral 10. The valve assembly includes a valve body 12 cast from a suitable material such as aluminum. Although various shapes for the valve body are contemplated, in the illustrated embodiment, the valve body includes an elongated manifold portion 14 interconnected with an inlet portion 16 converging away from the manifold portion transversely thereof. Connected to and projecting from the inlet portion 16, is a suction conduit section 18 through which the valve body is adapted to be connected by a flexible hose for example to a source of suction pressure such as a vacuum pump.

As more clearly seen in FIG. 2, a flow passage 20 extends between the chamber 22 enclosed by the inlet portion 16 of the valve body and the chamber 24 enclosed by the manifold portion 14 of the valve body. Also, the inlet portion 16 is connected to the suction conduit section 18 in laterally offset relation to the manifold portion 14 in order to accommodate an electrically operated solenoid controlled actuator 26 of a well known type through which limited angular displacement is imparted to an actuator shaft 28 that extends from the solenoid actuator 26 into the valve body in transverse relationship to the elongated manifold portion 14 and suction conduit section 18. A bore 30 is formed in the valve body for receiving the actuator shaft 28 in intersecting relationship to the passage 20. The actuator shaft 28 extends into the bore 30 from one side of the valve body provided with an O-ring seal 32 to prevent fluid leakage. Connected to the actuator shaft within the passage 20, is a cam element 34 normally positioned by the actuator shaft when the actuator 26 is deenergized, so that its flat profile portion 37 engages a gate leaf element 38.

The gate leaf element 38 as more clearly seen in FIGS. 3 and 4, is elongated so as to extend substantially along the top wall surface 40 of the manifold chamber 24 having a peripheral rim on which a sealing gasket 42 is mounted. The sealing gasket 42 thus encloses a plane area at a desired location on which the valve is positioned, this area being substantially greater than the flow area of the suction conduit section 18. The gate leaf element 38 is normally held in its flat, undeformed condition shown on the surface 40 closing the passage 20 by means of a pair of mounting fastener assemblies 44 that extend through he manifold portion 14 of the valve body on either side of the inlet portion as more clearly seen in FIG. 1.

Each of the fastener assemblies 44 includes a slotted head 46 from which a shank extends through a threaded opening 48 in the manifold portion of the valve body. The shank of the fastener assembly has a threaded end portion 50 projecting beyond the rim of the manifold chamber 24 and a non-threaded section 52 located therein and extending through end slots 54 formed in the gate leaf element 38. A retainer ring 55 as more clearly seen in FIG. 1 is mounted on the non-threaded portion 52 of the fastener shank to hold the gate leaf element 38 against the surface 40 in the flow blocking position of the gate element. A spacer 56 is mounted on the fastener shank between the slotted head 46 and the external surface of the valve body.

It will be apparent that upon angular displacement of the actuator shaft 28 by 45 degrees, the cam element 34 rotatable therewith will elastically deflect the gate element 38 in order to open the passage 20 and establish fluid communication between the inlet and manifold chambers 22 and 24 thereby applying suction pressure to the location at which the valve assembly is applied. As more clearly seen in FIGS. 4, 5 and 6, a second gate element 58 is secured to the actuator shaft 28 and held pressed against the side surface of the valve body by a spring 60. The gate element 58 is rotatable with the actuator shaft in order to cover a pair of vent passages 62 on either side of the rotational axis of the actuator shaft. Fluid communication is established between the vent passages 62 and the manifold chamber 24 by means of connecting passage bore 64. Thus, when the primary gate element 38 is elastically deflected to its open position, the vent passages 62 and 64 are blocked by the gate element 58 in order to enable the rapid establishment of vacuum pressure within the manifold chamber 24. On the other hand, upon deenergization of the actuator 26 and return of the actuator shaft and cam element to its normal position, the vent passages will be uncovered by the gate element 58 at the same time that the gate element 38 closes in order to rapidly re-pressurize the manifold chamber 24. Stiffening elements 66 as more clearly seen in FIGS. 3 and 4 are secured to the primary gate element 38 on either side of the area engaged by the actuator cam element 34 in order to ensure restoration of the gate element to its flat, valve closing position.

Figure 7:
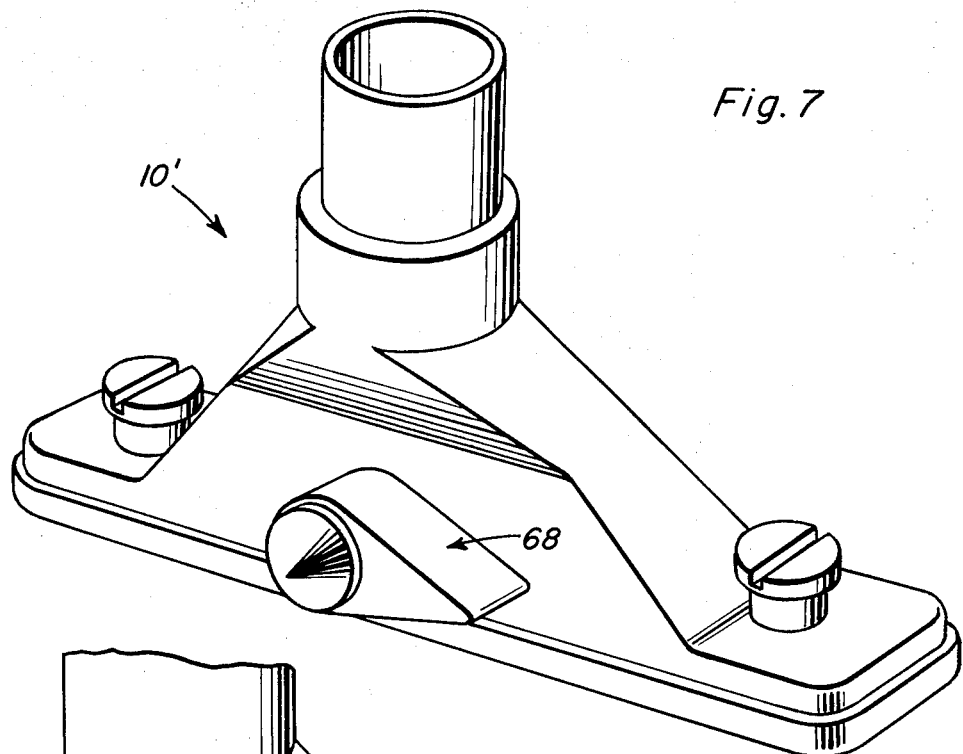
FIG. 7 is a perspective view showing another embodiment of the valve assembly constructed in accordance with the present invention.
Figure 8:
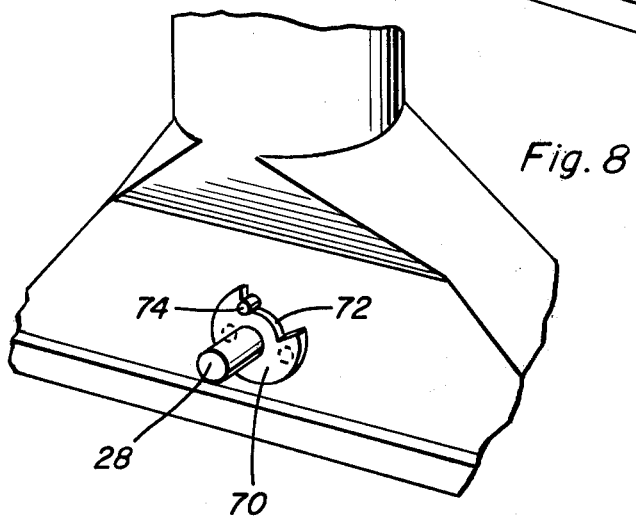
FIG. 8 is a partial perspective view of the valve assembly shown in FIG. 7 with a portion thereof disassembled.
Figure 9:
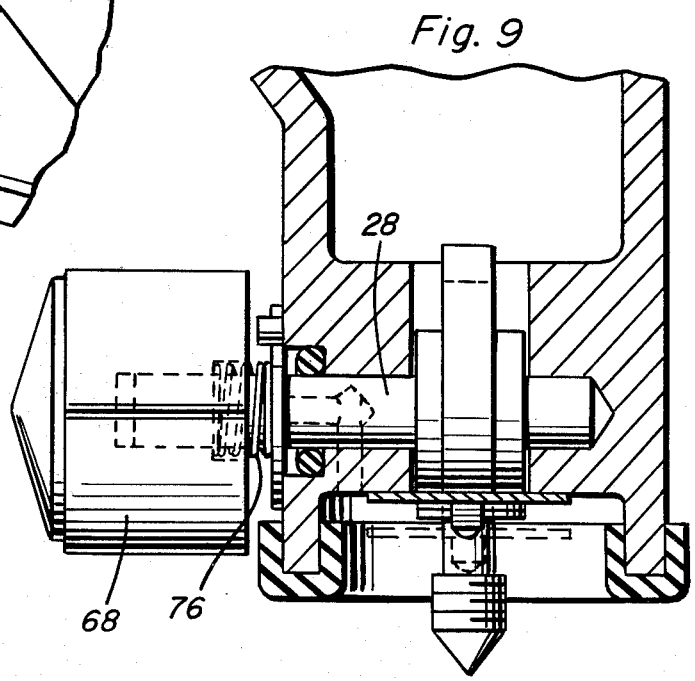
FIG. 9 is a partial sectional view taken substantially through a plane indicated by section line 9—9 in FIG. 7.

FIGS. 7, 8 and 9 illustrate another form of valve assembly generally referred to by reference numeral 10' which is similar in construction and operation to the valve assembly 10 hereinbefore described except for the use of a manual actuator knob 68 in lieu of the solenoid operated actuator 26. The actuator shaft 28 associated with the valve assembly 10' is accordingly splined to the knob 68. Further, a modified form of secondary gate 70 is utilized, as more clearly seen in FIG. 8. The gate 70 also acts as a stop plate and is accordingly provided with an arcuate recess 72 that extends 45° relative to the rotational axis of the actuator shaft 28. A stop pin 74 projecting from the side wall of the valve body is received in the recess 72 in order to limit angular rotation of the actuator shaft to the 45° arc of movement aforementioned in connection with the valve assembly 10. A spring 76 extends from the knob 68 when fastened to the end of the actuator shaft and bears against the gate plate 70 as more clearly seen in FIG. 9. Thus, except for the manual operation of the valve, the valve assembly 10' operates in the same manner as the valve assembly 10 hereinbefore described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A vacuum valve assembly for applying suction pressure from a source to a location to be evacuated, comprising a valve body having an inlet portion and a manifold portion, suction conduit means of predetermined flow area connected to said inlet portion for connecting the valve body to said source, sealing means peripherally mounted on said manifold portion of the valve body for sealing the manifold portion at said locaton enclosing an area substantially greater than said predetermined flow area of the suction conduit means, gate means mounted in the valve body for blocking fluid communication between the inlet and manifold portions, valve actuating means engageable with the gate means for selectively opening the same to unblock fluid communication between the inlet and manifold portions of the valve body and re-pressurizing means connected to the actuating means for venting the manifold portion of the valve body to atmosphere simultaneously with the blocking of fluid communication between the inlet and manifold portions.

2. The combination of claim 1 wherein said gate means comprises an elastically deformable leaf element, and anchoring means mounting the leaf element in a flow blocking position substantially parallel to the leaf element in the passage blocking condition thereof.

3. The combination of claim 2 wherein the actuating means includes an angularly displaceable actuator projecting from the valve body, and a cam connected to the actuator within the valve body in engagement with the gate means.

4. The combination of claim 3 wherein the re-pressurizing means includes a vent passage extending from the manifold portion of the valve body, and a gate element connected to actuating means in closing relation to the vent passage.

5. The combination of claim 1 wherein the actuating means includes an angularly displaceable actuator projecting from the valve body, and a cam connected to the actuator within the valve body in engagement with the gate means.

6. The combination of claim 5 wherein the re-pressurizing means includes a vent passage extending from the manifold portion of the valve body, and a gate element connected to actuating means in closing relation to the vent passage.

7. The combination of claim 1 wherein the re-pressurizing means includes a vent passage extending from the manifold portion of the valve body, and a gate element connected to actuating means in closing relation to the vent passage.

8. A vacuum valve assembly for applying suction pressure from a source to a location to be evacuated, comprising a valve body having an inlet portion and a manifold portion, suction conduit means of predetermined flow area connected to said inlet portion for connecting the valve body to said source, a sealing gasket peripherally mounted on said manifold portion in enclosing relation to an area substantially greater than said predetermined flow area of the suction conduit means, an elastically deformable leaf element, means mounting said leaf element in flow blocking relationship between the inlet and manifold portions of the valve body, and actuating means engageable with the leaf element for establishing fluid communication between the inlet and manifold portions in response to deformation of the leaf element.

9. The combination of claim 8 including means for venting the manifold portion in response to restoration of the leaf element to the undeformed flow blocking condition.

* * * * *